(12) United States Patent
Saether (10) Patent No.: US 7,259,612 B2
(45) Date of Patent: Aug. 21, 2007

(54) EFFICIENT CHARGE PUMP FOR A WIDE RANGE OF SUPPLY VOLTAGES

(75) Inventor: Terje Saether, Trondheim (NO)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/168,833

(22) Filed: Jun. 28, 2005

(65) Prior Publication Data

US 2006/0290410 A1    Dec. 28, 2006

(51) Int. Cl.
*G05F 1/10* (2006.01)
(52) U.S. Cl. ...................................... 327/536
(58) Field of Classification Search ................ 327/535, 327/536
See application file for complete search history.

(56) References Cited

U.S. PATENT DOCUMENTS

| | | | | |
|---|---|---|---|---|
| 5,748,032 A | * | 5/1998 | Baek | 327/536 |
| 6,064,251 A | | 5/2000 | Park | 327/536 |
| 6,157,242 A | * | 12/2000 | Fukui | 327/536 |
| 6,385,065 B1 | | 5/2002 | Roohparvar et al. | 363/60 |
| 6,483,728 B1 | * | 11/2002 | Johnson et al. | 363/60 |
| 6,486,729 B2 | * | 11/2002 | Imamiya | 327/536 |
| 6,501,325 B1 | | 12/2002 | Meng | 327/536 |
| 6,603,673 B2 | * | 8/2003 | Yamamoto | 363/60 |
| 6,633,494 B2 | | 10/2003 | Roohparvar et al. | 363/60 |
| 6,781,440 B2 | * | 8/2004 | Huang | 327/537 |
| 6,801,076 B1 | | 10/2004 | Merritt | 327/536 |
| 6,833,752 B2 | | 12/2004 | Merritt et al. | 327/536 |
| 6,972,973 B2 | * | 12/2005 | Abe et al. | 363/60 |
| 2001/0035787 A1 | | 11/2001 | Merritt et al. | 327/536 |
| 2002/0039301 A1 | | 4/2002 | Roohparvar et al. | 363/60 |
| 2002/0041503 A1 | | 4/2002 | Roohparvar et al. | 363/60 |
| 2006/0006925 A1 | * | 1/2006 | Yamazoe et al. | 327/536 |

* cited by examiner

*Primary Examiner*—Jeffrey Zweizig
(74) *Attorney, Agent, or Firm*—Schneck & Schneck; Thomas Schneck (57) ABSTRACT

A voltage booster and regulator usable with Dickson-type charge pump device is specifically adapted to maintain efficiency with both high and low supply voltages. For high voltage supplies (e.g., 2.6 volts or more), the charge pump reduces overall power consumption resulting in a more efficient design. For low voltage applications (e.g., for supply voltages less than 2.6 volts), the charge pump uses a booster circuit to increase a clock input potential beyond the supply voltage available to a typical Dickson array. Further, the charge pump avoids inherent diode voltage drops in a typical Dickson array.

22 Claims, 6 Drawing Sheets

EFFICIENT CHARGE PUMP FOR A WIDE RANGE OF SUPPLY VOLTAGES

TECHNICAL FIELD

The present invention relates to a Dickson charge pump. More particularly, the invention relates to a Dickson charge pump operable at either high or low supply voltages.

BACKGROUND ART

Extensive use is currently made of nonvolatile digital data memory devices. Various consumer products, such as personal data assistants (PDAs), cellular telephones, and electronic notebooks require nonvolatile memory devices for storing information in a compact support of large capacity.

A shortcoming of nonvolatile memory devices is a high rate of power consumption associated with their operation. The rate of power consumption is obviously of major consequence to portable products such as those listed above since such devices are typically battery powered.

Most of the power expended to operate such memories goes to charge pump circuits, which are arranged to raise the voltage value above the supply level (usually the battery voltage level) for further supplying a part of the circuitry integrated in the memory device. This power expenditure is a result of high voltages needed to perform such basic operations as program and erase operations in nonvolatile memory devices. Where low voltage supply circuits are utilized, read operations as well as program and erase voltages are higher than the supply voltage.

Thus, providing charge pump circuits that utilize as small of a drain as possible on the power supply for their operation is of significant importance, and the present trend toward ever lower supply voltages for integrated circuits can only increases this importance.

Figure 1A:
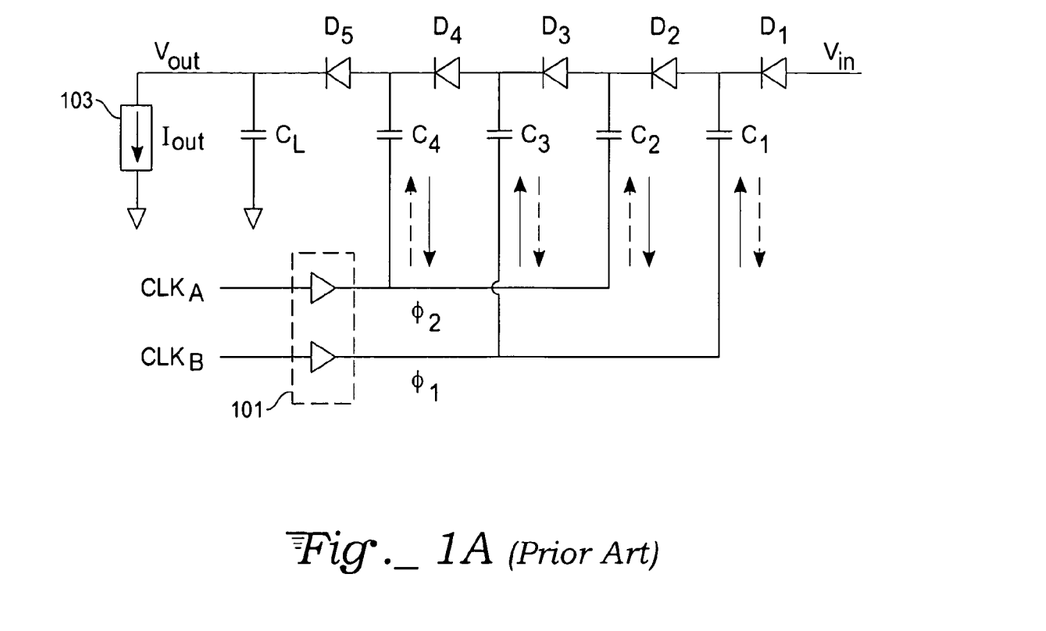
FIG. 1A is a Dickson charge pump of the prior art.

With reference to FIG. 1, a circuit diagram of a typical four-stage Dickson charge pump device includes diodes $D_1$-$D_5$ connected in series, with coupling capacitors $C_1$-$C_4$ each being connected to a node between the diodes $D_1$-$D_5$. The Dickson charge pump circuit also includes an output capacitor $C_L$. The output capacitor $C_L$ is connected in parallel with an external load 103. Input clock pulses $CLK_A$ and $CLK_B$ are of opposite phase with respect to each other. The clock pulses $CLK_A$ and $CLK_B$ are input to a clock driver 101. The clock driver 101 is provided with a power supply voltage $V_{DD}$ (not shown). An output phase of the clock pulses $CLK_A$ and $CLK_B$ is represented as φ1 and φ2 respectively. The clock pulse phase φ1 is fed to the capacitors $C_1$ and $C_3$, while the clock pulse phase φ2 is fed to the capacitors $C_2$ and $C_4$.

In a stable state, in which a constant current $I_{out}$ flows out through the external load 103, an input current to the charge pump device is a sum of a current from an input voltage $V_{DD}$ and a current provided from the clock driver. These currents are as described below, disregarding charging or discharging currents to or from any stray circuit capacitance. During a clock period where φ1 is "high" (i.e., logic "1") and φ2 is "low" (i.e., logic "0"), an average current of 2·($I_{out}$) flows through each of a plurality of paths in directions depicted in the figure as solid line arrows.

During a subsequent clock period where φ1 is "low" and φ2 is "high," an average current of 2·($I_{out}$) flows through each of the plurality of paths in directions depicted in the figure as dashed line arrows. An average current of each of these aforementioned currents over a complete clock cycle is $I_{out}$. An increased voltage from the charge pump device in the stable state is expressed by equation (1), $$V_{out}=V_{in}-V_d+n(V_{\phi'}-V_1-V_d) \quad (1)$$

where $V_{\phi'}$ refers to an amplitude of a voltage at each of the connecting nodes induced through the coupling capacitor by a change in the clock pulse; $V_1$ denotes a voltage drop due to the output current $I_{out}$; $V_{in}$ denotes the input voltage, which is usually set at $V_{DD}$ in positive voltage boosting and at 0 volts in negative voltage boosting; $V_d$ refers to a forward bias diode voltage; and n denotes a number of stages of pumping.

Further, $V_1$ and $V_{\phi'}$ are expressed by the following equations $$V_1 = \frac{I_{out}}{f(C_i+C_s)} \equiv \frac{T \cdot I_{out}}{C_i+C_s} \quad (2)$$

$$V_{\phi'} = \frac{V_\phi \cdot C}{C_i+C_s} \quad (3)$$

where $C_i$ represents a clock coupling capacitance of one of the capacitors $C_1$-$C_4$; $C_s$ is a stray capacitance at each of the connecting nodes; $V_\phi$ is an amplitude of the clock pulses; f is a frequency of the clock pulses; and T is a clock period of the clock pulses. Power efficiency, η, of the charge pump device is calculated, disregarding charging/discharging currents from/to the clock driver to/from the stray capacitors and assuming $V_{in}=V_{DD}$, by $$\eta = \frac{V_{out} \cdot I_{out}}{(n+1)V_{DD} \cdot I_{out}} \equiv \frac{V_{out}}{(n+1)V_{DD}} \quad (4)$$

Consequently, the charge pump device boosts the voltage by successively transferring electric charge to a next stage using a diode as a charge transfer device. However, an MOS transistor is easier than a PN junction diode to implement in a semiconductor integrated circuit due to fabrication compatibility within the manufacturing process.

Figure 1B:
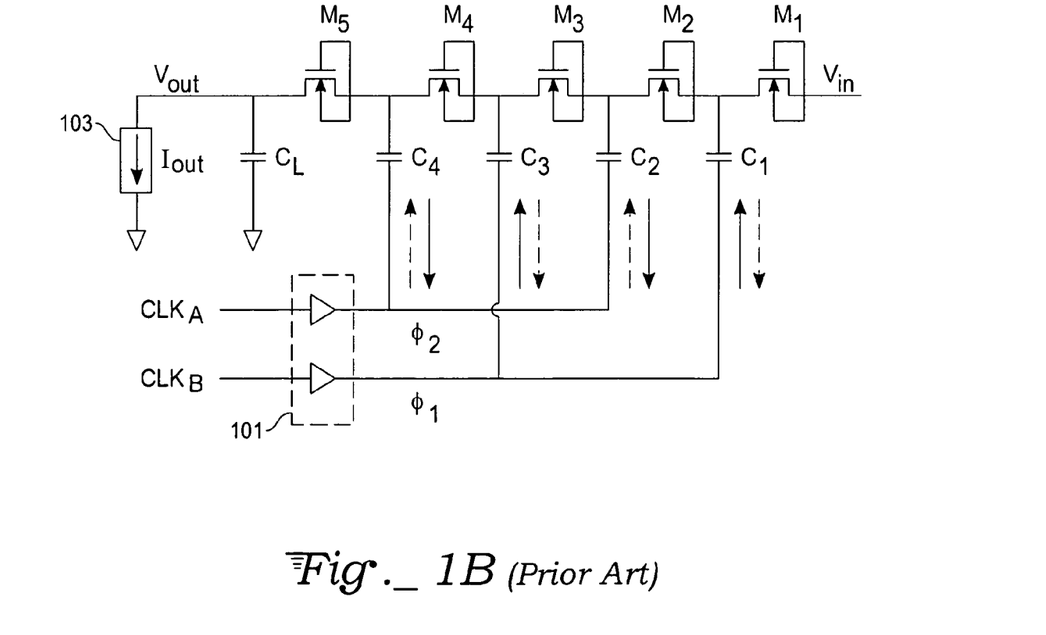
FIG. 1B is a cross-sectional view showing a charge pump device of the prior art implemented in a CMOS structure.

Thus, MOS transistors, as indicated in FIG. 1B, are used as the charge transfer devices in place of the diodes $D_1$-$D_5$ of FIG. 1A. Using MOS transistors, $V_d$ in equation (1) is replaced with $V_{th}$, where $V_{th}$ represents a threshold voltage of the MOS transistor.

Figure 2:
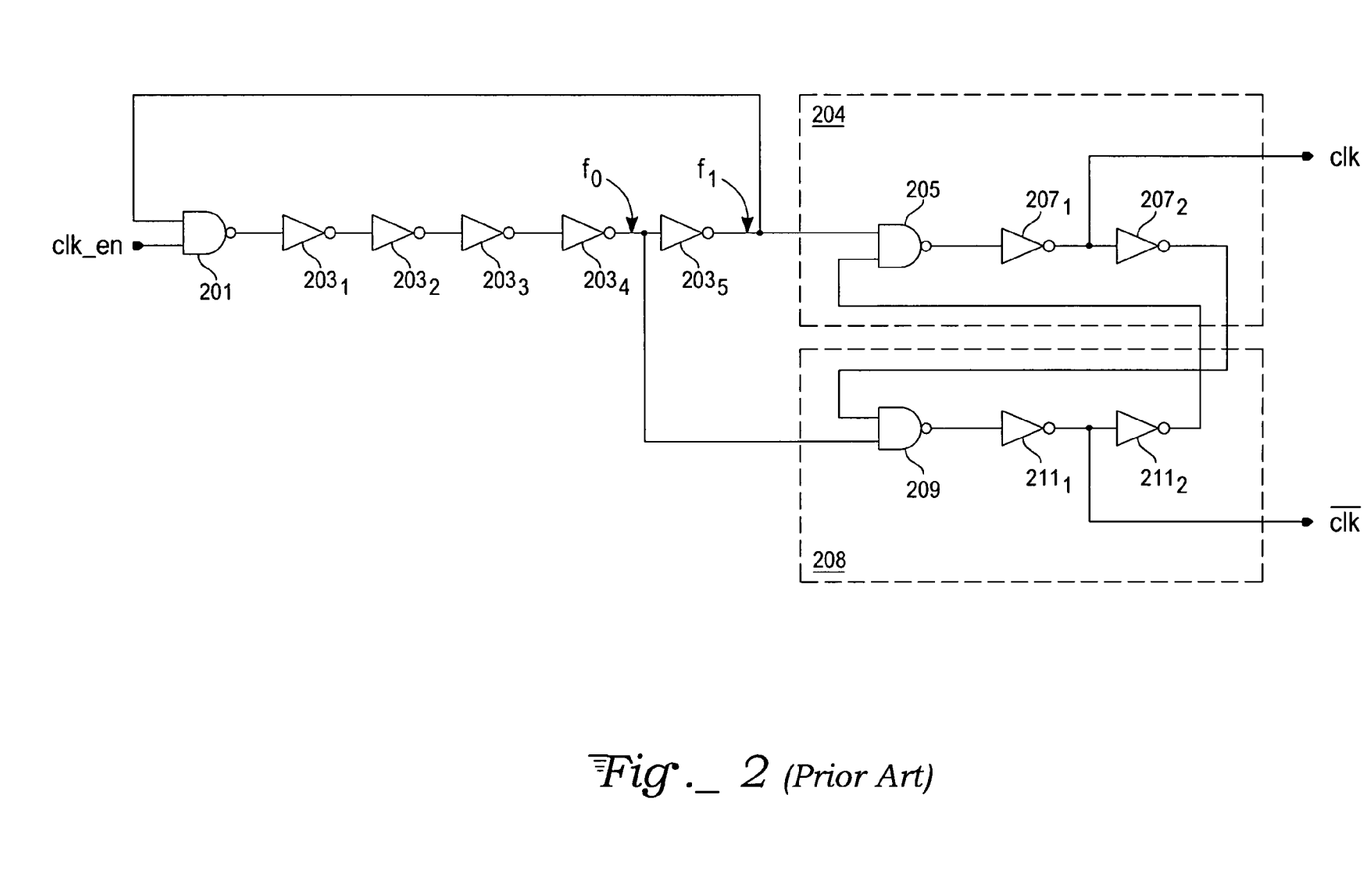
FIG. 2 is a simple ring oscillator circuit that can be used to drive a charge pump circuit.

FIG. 2 shows a simple ring oscillator that can be used to drive either of the Dickson charge pump circuits shown in FIGS. 1A and 1B. The ring oscillator is composed of a number of inverter elements $203_1$, $203_2$, ..., $203_5$ connected in series. An input NAND gate 201 provides a means for disabling the oscillator when a low voltage signal is presented at a first input of the NAND gate 201, labeled "clk_en." Each oscillator output produces signals, clk and $\overline{clk}$, which are stable (i.e., φ1=1, φ2=0) when a signal at clk_en is low. When enabled, the input NAND gate 201 inverts the signal from a second input of the NAND gate 201. The signal is then propagated through the inverter elements $203_1$, $203_2$, ..., $203_5$ back to the second input of the NAND gate 201. This process continues until the enable signal at clk_en goes back to low. The amount of time taken to propagate the signal back to the second input is determined by a delay of each of the inverter elements $203_1$, $203_2$, ..., $203_5$. This inverter delay is dependent on the supply voltage $V_{DD}$; the supply voltage $V_{DD}$ determines a maximum gate-source voltage that can be applied to transistors within each of the inverter elements $203_1$, $203_2$, ..., $203_5$. The gate-source voltage determines a current drive for each of the inverter elements $203_1$, $203_2$, ..., $203_5$, thus determining the propagation delay. A signal that is present at $f_1$ is provided to a first clock driver portion 204, which is comprised of a NAND gate 205, a first inverter $207_1$ and a second inverter $207_2$, all connected in serial manner with each other. The first clock driver portion 204 produces an output "clk." A signal at $f_0$ is provided to a second clock drive portion 208, which is comprised of a NAND gate 209, a first inverter $211_1$ and a second inverter $211_2$, all connected in serial manner with each other. The second clock driver portion 208 produces an output "$\overline{clk}$." The output signals clk and $\overline{clk}$ are 180° out of phase with respect to each other.

SUMMARY

An exemplary voltage booster and regulator usable with Dickson-type charge pump device is specifically adapted to maintain efficiency with both high and low supply voltages. For high voltage supplies (e.g., 2.6 volts or more), the charge pump reduces overall power consumption resulting in a more efficient design. For low voltage applications (e.g., for supply voltages less than 2.6 volts), the charge pump uses a booster circuit to increase a clock input potential beyond the supply voltage available to a typical Dickson array. Further, the charge pump avoids inherent diode voltage drops in a typical Dickson array.

In an exemplary embodiment, the charge pump apparatus comprises a plurality of switching devices, a voltage booster, and a voltage regulation device. The plurality of switching devices are configured to connect and disconnect one or more charge storage devices to a supply voltage source. The voltage booster contains the one or more charge storage devices and are configured, along with the plurality of switching devices, to provide a voltage output that is greater than both a threshold voltage of each of the plurality of switching devices and the supply voltage source. The voltage output is adapted to be coupled to an input of a charge pump circuit (e.g., a Dickson-type charge pump). The voltage regulation device is coupled to receive as an input the supply voltage source and is configured to be enabled if the supply voltage source is low and disabled if the supply voltage source is high.

DETAILED DESCRIPTION

Figure 3:
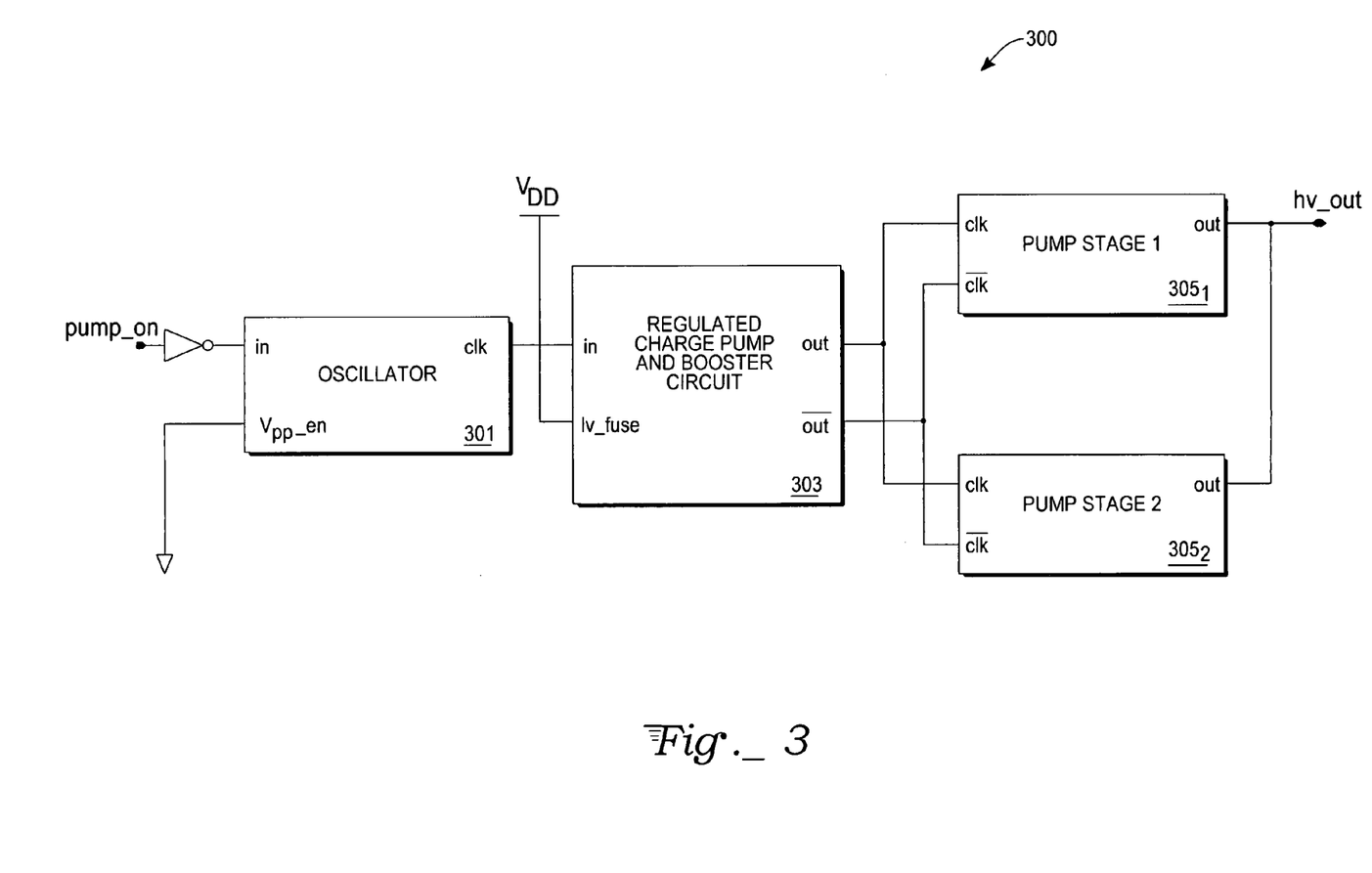
FIG. 3 is an exemplary block diagram of a charge pump circuit of the present invention.

The block diagram of FIG. 3 provides an overview of various parts of the charge pump circuit 300 of the present invention. The charge pump circuit 300 includes an oscillator circuit 301, a regulated charge pump and booster circuit 303, and a plurality of pump stages $305_1$, $305_2$.

The oscillator circuit 301 receives a enable signal pump_on, fed through an inverter, and a single output clk signal. Details of the oscillator 301 are not discussed as such circuits are well-known within the art. One exemplary oscillator circuit which may be used with the present invention is described in detail in U.S. patent application Ser. No. 10/995,458 filed Nov. 22, 2004 (claiming priority from French Patent Application, serial number 04/08931, filed Aug. 17, 2004), entitled "Oscillator Circuit for EEPROM High Voltage Generation," and commonly assigned, along with this application, to Atmel Corporation, San Jose, Calif.

The regulated charge pump and booster circuit 303 receives, as an input, the clk signal from the oscillator 301. A supply voltage, $V_{DD}$, is connected to the regulated charge pump and booster circuit 303 at lv_fuse, and two clocked output signals, out and $\overline{out}$ provide a clock and inverted clock input to the plurality of pump stages $305_1$, $305_2$. The two clocked output signals, out and $\overline{out}$ may or may not be boosted in amplitude depending on a potential of the input supply voltage $V_{DD}$. Typically, if the supply voltage $V_{DD}$ is less than approximately 2.6 volts, the potential of the output signals will be boosted. Details of the regulated charge pump and booster circuit 303 are described, infra, with reference to FIGS. 4, 5A, and 5B.

The plurality of pump stages $305_1$, $305_2$ may be implemented as a typical Dickson-type pump stage as described with reference to the CMOS-based Dickson pump stage of FIG. 1B. Although only two stages are shown, a skilled artisan will recognize that a higher output voltage and/or current may be obtained by combining numerous pump stages in parallel and/or series.

Figure 4:
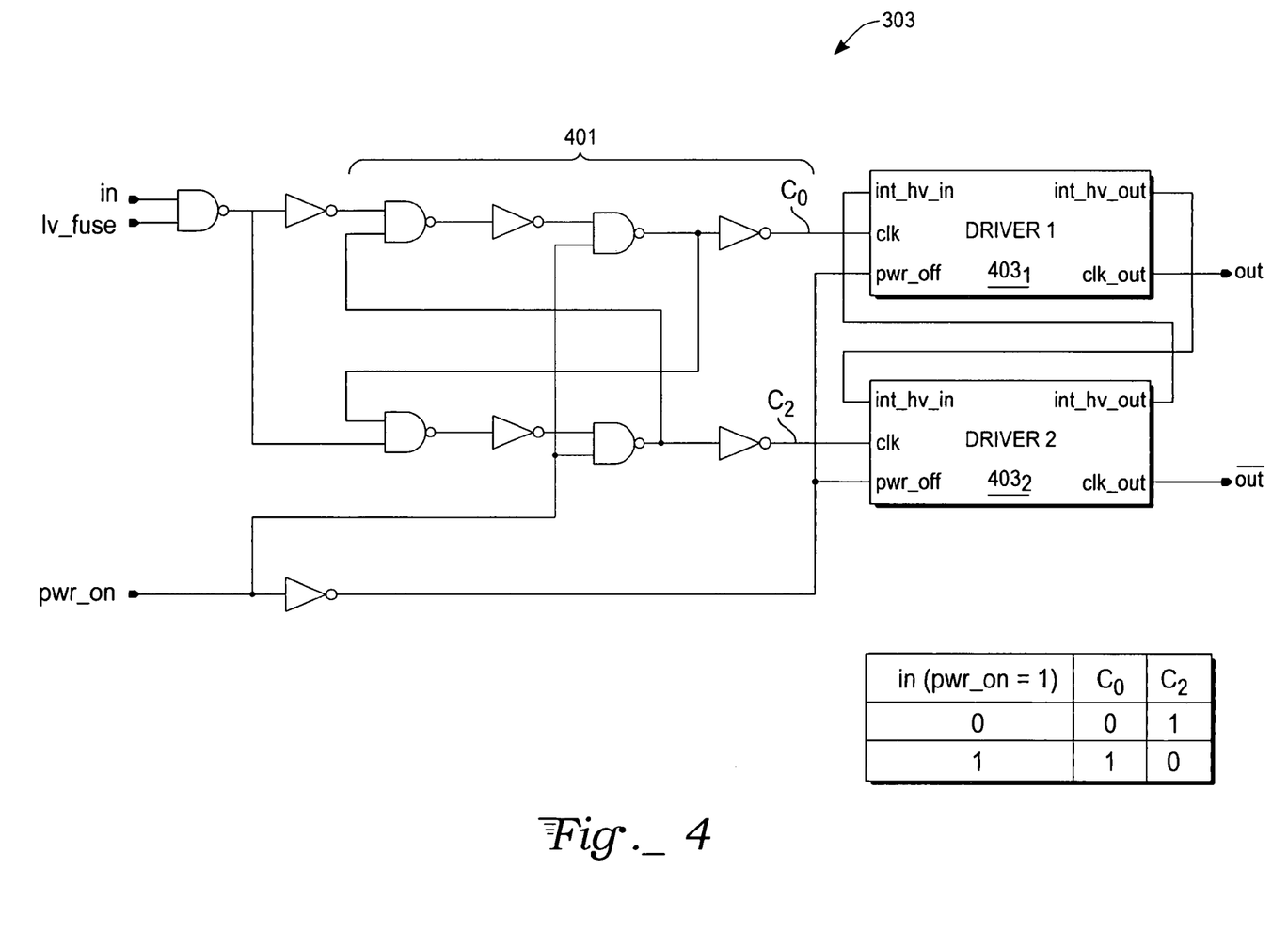
FIG. 4 is an exemplary regulated charge pump and booster circuit stage of the charge pump of FIG. 3.

The regulated charge pump and booster circuit 303 is described in more detail in an exemplary embodiment of FIG. 4. FIG. 4 includes clock inversion circuitry 401 and a plurality of driver circuits $403_1$, $403_2$. The clock inversion circuitry 401 includes two parallel NAND-inverter-NAND-inverter series connected string, each string connected in parallel with the other. Outputs $c_0$ and $c_2$ of the clock inversion circuitry 401 are shown in the table on FIG. 4 as complementary to each other for a given input (i.e., a "0" or "1") assuming power is on (i.e., pwr_on=1). Each output $c_0$, $c_2$ serves as an input for the plurality of driver circuits $403_1$, $403_2$.

Each of the driver circuits $403_1$, $403_2$ is cross-coupled to the other. The driver circuits $403_1$, $403_2$ contain the predominant circuitry controlling both voltage regulation and booster circuitry. Exemplary voltage regulation and booster circuitry are each described in detail with reference to FIGS. 5A and 5B.

Figure 5A:
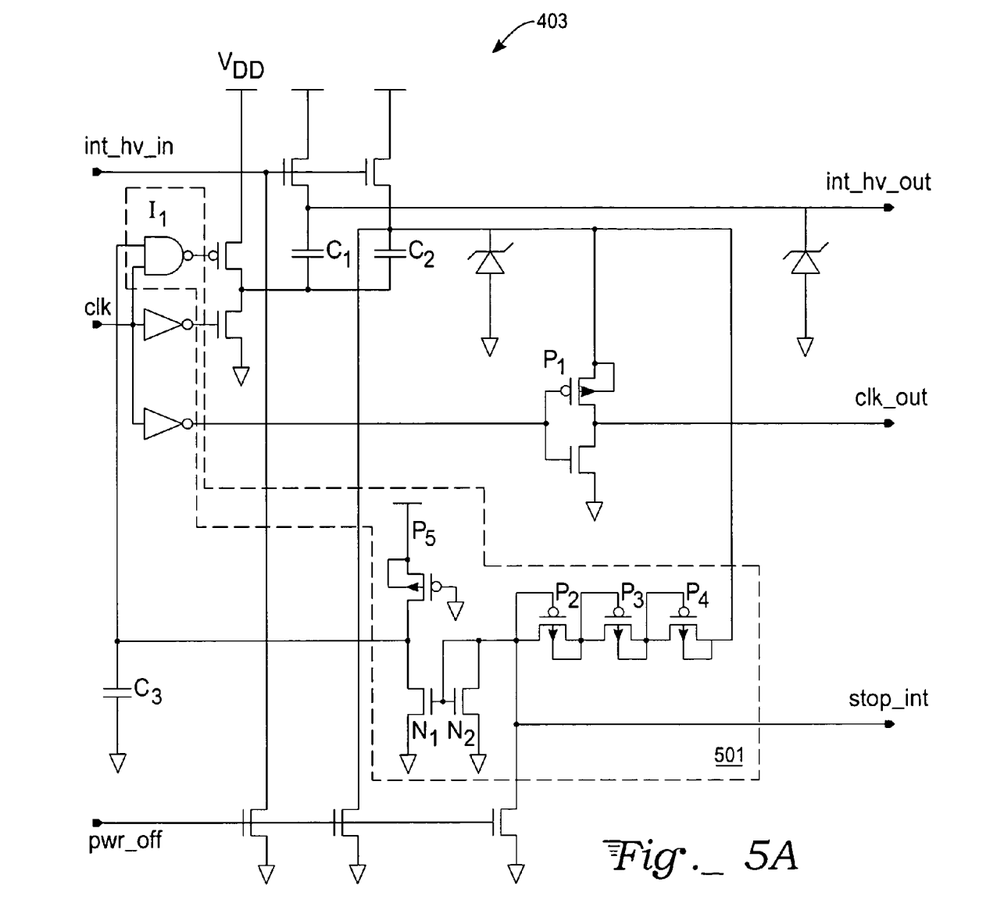
FIG. 5A is an exemplary driver circuit of the regulated charge pump and booster circuit stage of FIG. 4.

FIG. 5A includes details of a specific exemplary driver circuit 403, usable as an output stage for each of the driver stages $403_i$ of the regulated charge pump and booster circuit 303 of FIG. 3. A first and second large capacitor, $C_1$ and $C_2$, store an input supply voltage, $V_{DD}$. Charge stored in the second large capacitor $C_2$ is delivered to the Dickson pump stages $305_i$ through the PMOS transistor $P_1$ via a clk_out tap. The clk_out tap is a boosted version of the supply voltage $V_{DD}$. In a specific exemplary embodiment, the first large capacitor $C_1$ has a storage value of 4.5 picofarads and the second large capacitor $C_2$ has a storage value of 55 picofarads. Details for a generic exemplary booster circuit is given infra with reference to FIG. 5B.

FIG. 5A also includes a voltage regulator portion 501. The voltage regulator portion 501 includes additional circuitry providing a feedback path preventing the output voltage at int_hv_out from exceeding an absolute maximum voltage rating for IC transistors. In this embodiment, the voltage regulator portion includes PMOS transistors $P_2$, $P_3$, and $P_4$ connected in series, gate coupled NMOS transistors $N_1$ and $N_2$, a $V_{DD}$ pass transistor $P_5$, and a NAND gate $I_1$. In a specific exemplary embodiment, the absolute maximum voltage rating for the IC transistors is 5.5 volts.

Figure 5B:
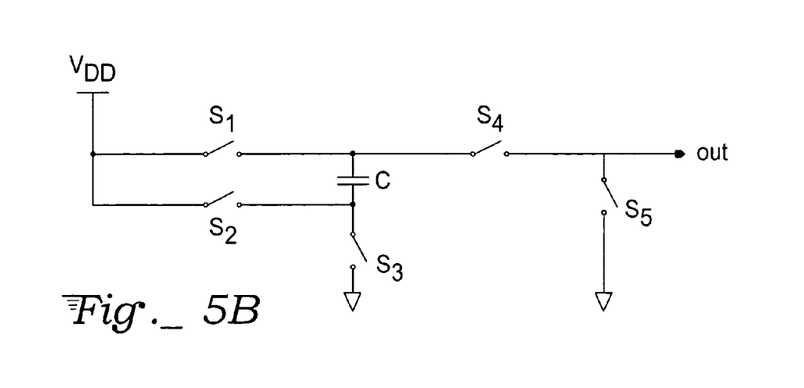
FIG. 5B is a functional representation of the driver circuit of FIG. 5A.

The functional representation of FIG. 5B provides a high-level explanation of the booster circuit portion of FIG. 5A. In operations involving a low supply voltage: During a first clock phase, $\phi 1$, switches $S_1$, $S_3$, and $S_5$ are turned on (i.e., "closed") while switches $S_2$ and $S_4$ are turned off (i.e., "open"). Switch $S_5$ pulls the output "low." Concurrently, the capacitor C is charged to the supply voltage level, $V_{DD}$. During a second clock phase, $\phi 2$, the switches $S_1$, $S_3$, and $S_5$ are turned off while switches $S_2$ and $S_4$ are turned on. The output voltage now rises to roughly twice the supply voltage, $V_{DD}$. Therefore, the subsequent pump stages 305 see a voltage that alternates between 0 volts and $2 \cdot V_{DD}$, making the pump stage 305 more efficient as any diode voltage drops comprise a much smaller percentage of the total starting supply voltage. For example, assume a pump stage diode voltage drop is 0.7 volts. For a supply voltage of only 1.2 volts, the percentage efficiency due to potential lost across the diode is $$\frac{1.2V - 0.7V}{1.2V} \cong 42\%.$$

However, by boosting the voltage prior to entering the pump stage, the percentage efficiency increases to $$\frac{2.4V - 0.7V}{2.4V} \cong 71\%.$$

Thus, the booster circuit portion produces a significant increase in efficiency.

In operations involving a high supply voltage: Switches $S_1$ through $S_5$ are operated differently than in low voltage operation due to the regulating function of the circuit. The regulating circuit measures a voltage output by the circuit. As discussed supra with regard to FIG. 5A, the regulation circuit of the exemplary embodiment includes PMOS transistors $P_2$-$P_5$, NMOS transistors $N_1$ and $N_2$, and the NAND logic gate $I_1$. Referring back again to FIG. 5B operated at a high voltage, during clock $\phi 1$, the switches $S_1$, $S_3$, and $S_5$ are turned on while $S_2$ and $S_4$ are switched off. The capacitor is again charged to a level of the potential $V_{DD}$. The output voltage remains low due to switch $S_5$ being turned on. In the second clock phase, $\phi 2$, the switches $S_1$ and $S_5$ are turned off, $S_2$ remains turned off, $S_3$ remains turned on, and $S_4$ is switched on if the measured output voltage remains below approximately 2.6 volts. The main difference between this high voltage operation and the low voltage operation described supra is that the switch $S_2$ is constantly off and the switch $S_3$ is constantly on. Therefore, the output voltage is no longer boosted as in the low voltage operation but rather, the output voltage alternates between 0 volts and about 2.6 volts. Therefore, an input voltage to the subsequent Dickson charge pump stage is always either 0 volts or about 2.6 volts. Additionally, energy transferred to the charge pump stage is limited by a value of the capacitor C. Hence, a drawn supply current is limited, thereby making the pump stage well-behaved at higher voltages (e.g., consistent and well-known output voltages with a consistent pulse width).

Figure 6:
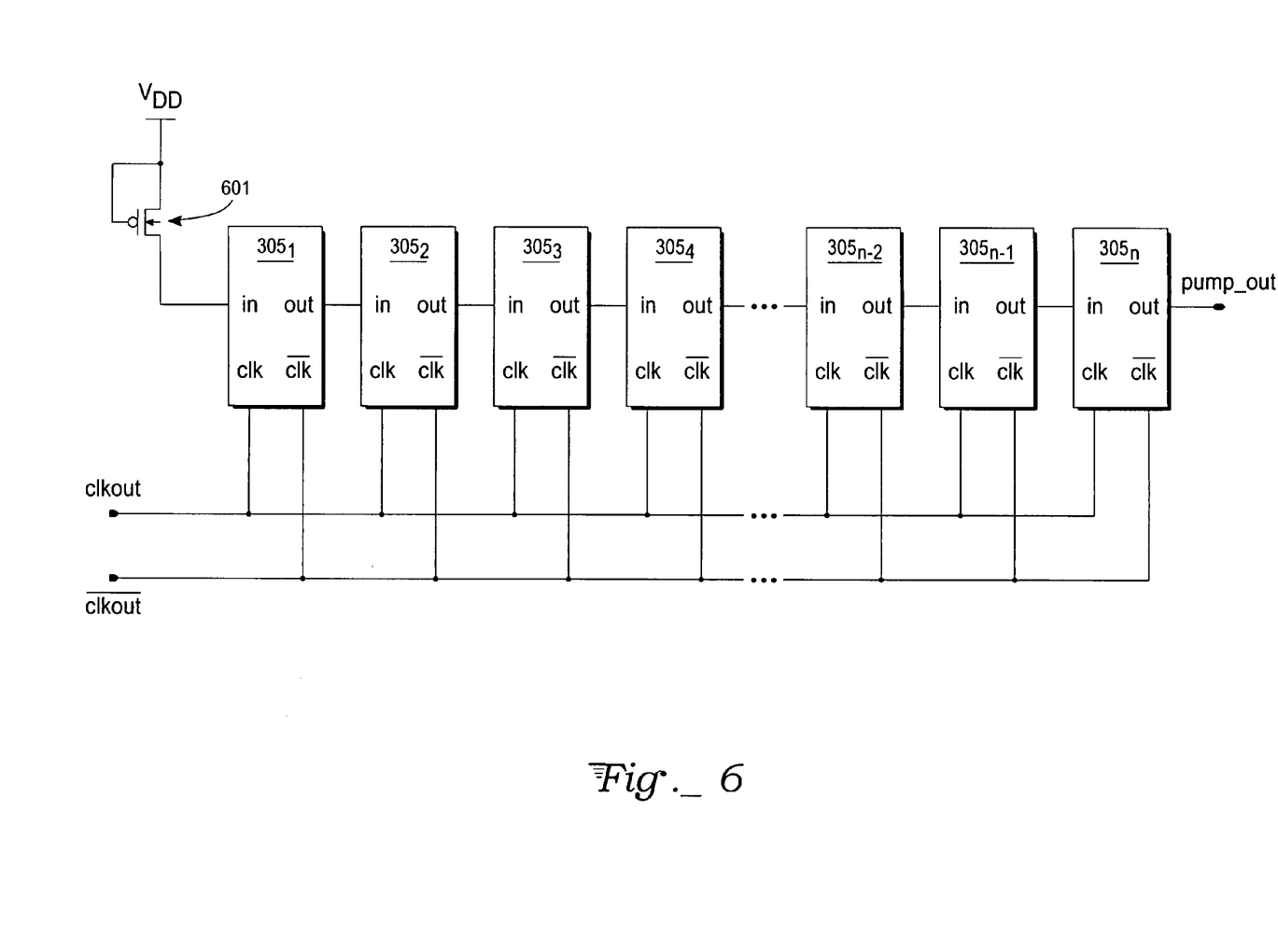
FIG. 6 is an exemplary pump stage of the charge pump circuit of FIG. 3.

FIG. 6 includes a plurality of pump stages $305_1$, $305_2$, ..., $305_n$ connected in series, with each pump stage $305_i$ connected to both a clkout signal and a complementary (i.e., opposite phase) $\overline{\text{clkout}}$ signal from the regulated charge pump and booster circuit 303 (FIG. 3). The $V_{DD}$ pass transistor 601, in this embodiment, is chosen to be an "nw" device (with a higher than normal threshold voltage, $V_t$) rather than an "nws" device to avoid current leak-back to the supply at low supply voltages. The "nw" device is a native (i.e., without threshold implant) high voltage n-channel transistor with a p-well. The "nw" transistor has a higher threshold voltage (approximately 0.22 volts) than the "nws" device and, thus, lower leakage. The "nws" device is a native high voltage n-channel transistor in substrate. The threshold voltage of the "nws" transistor is about —0.09 volts. A skilled artisan will recognize that the "nws" device may be substituted for the "nw" device with a minimal performance difference.

In the foregoing specification, the present invention has been described with reference to specific embodiments thereof. It will, however, be evident to a skilled artisan that various modifications and changes can be made thereto without departing from the broader spirit and scope of the invention as set forth in the appended claims. For example, skilled artisans will appreciate that although the booster and regulator circuits have been described in terms of specific circuitry and specific voltage levels, equivalent or similar circuits and voltages may be implemented without departing from the scope of the present invention presented herein. Further, individual devices such as the capacitor described in connection with the voltage booster circuitry may be any charge storage device such as a transistor connected to act as a charge storage mechanism, a series of plates coupled with an interleaved dielectric fabricated as part of an integrated circuit, or a comb capacitor fabricated by techniques well known in the semiconductor art. Other items are described in terms of MOS integrated circuit devices although a person of ordinary skill in the art will recognize that other fabrication techniques, such as bipolar or BiCMOS techniques, may readily be employed as well. The specification and drawings are, accordingly, to be regarded in an illustrative rather than a restrictive sense.

What is claimed is:

1. A charge pump apparatus comprising:
   a voltage booster for a clock signal, the voltage booster having
   i) a voltage input, a clock input, and a clock output, the voltage input adapted to be coupled to a supply voltage source to receive a supply voltage, the clock input adapted to be coupled to an oscillator stage to receive a clock signal, the clock output adapted to supply a charge pump circuit;
   (ii) one or more charge storage devices; and
   (iii) a plurality of switching devices, the plurality of switching devices being configurably arranged such that:
   during a first clock phase of the clock signal, a first terminal of at least one of the charge storage devices is coupled to the supply voltage and a second terminal thereof is coupled to ground, such that the first terminal is charged to a supply voltage level, the clock output also coupled to ground, and during a second clock phase of the clock signal, the first terminal is coupled to the clock output and the second terminal is coupled to the supply voltage whenever the supply voltage is less than a threshold voltage level, such that the first terminal coupled to the clock output is charged further to greater than the supply voltage, and the second terminal is coupled to ground whenever the supply voltage is at least that of the threshold voltage level, such that the first terminal coupled to the clock output is at the supply voltage.

2. The charge pump apparatus of claim 1 further comprising:
an oscillator stage, the oscillator stage configured to produce a clock output and an inverted clock output each of the clock outputs forming a clock signal that is input into a voltage booster; and
a Dickson charge pump having a plurality of stages, each stage of the charge pump receiving clock outputs from at least one voltage booster.

3. The charge pump apparatus of claim 2 wherein the supply voltage source is supplied to the Dickson charge pump through a pass transistor, the pass transistor chosen to avoid current leak-back to the supply voltage source at low supply voltages.

4. The charge pump apparatus of claim 1 wherein the plurality of switching devices are comprised of MOS transistors.

5. The charge pump apparatus of claim 1 wherein the one or more charge storage devices are comprised of capacitors.

6. A charge pump apparatus comprising:
a voltage booster for a clock signal, the voltage booster having
(iv) a voltage input, a clock input, and a clock output, the voltage input adapted to be coupled to a supply voltage source to receive a supply voltage, the clock input adapted to be coupled to an oscillator stage to receive a clock signal, the clock output adapted to supply a charge pump circuit;
(v) one or more charge storage devices; and
(vi) a plurality of switching devices, the plurality of switching devices being configurably arranged such that:
during a first clock phase of the clock signal, a first portion of the plurality of the plurality of switching devices is turned on while a second portion of the switching devices is turned off, at least one of the first portion pulling a level of the clock output low while a remainder of the first portion is charging a first terminal of the one or more charge storage devices to the supply voltage, and during a second clock phase of the clock signal, at least one of the second portion is turned on to couple the one or more charged charge storage devices to the clock output, another of the second portion being responsive to a voltage regulation device, either turned on to couple a second terminal of the one or more charge storage devices to the supply voltage to enable boosting of the clock output to a level of the clock output during the second phase about twice a level of the low supply voltage source, or turned off to couple the second terminal to ground to disable boosting of the clock output such that the clock output is at the supply voltage; and
a voltage regulation device, the voltage regulation device being coupled to receive as an input the supply voltage source, the voltage regulation device being configured to be enabled if the supply voltage source is less than a threshold voltage and disabled if the supply voltage source is at least that of the threshold voltage.

7. The charge pump apparatus of claim 6 further comprising:
an oscillator stage, the oscillator stage configured to produce a clock output and an inverted clock output each of the clock outputs forming a clock signal that is input into a voltage booster; and
a Dickson charge pump having a plurality of stages, each stage of the charge pump receiving clock outputs from at least one voltage booster.

8. The charge pump apparatus of claim 7 wherein the supply voltage source is supplied to the Dickson charge pump through a pass transistor, the pass transistor chosen to avoid current leak-back to the supply voltage source at low supply voltages.

9. The charge pump apparatus of claim 6 wherein the plurality of switching devices are comprised of MOS transistors.

10. The charge pump apparatus of claim 6 wherein the one or more charge storage devices are comprised of capacitors.

11. The charge pump apparatus of claim 6 wherein the threshold voltage is boo than about 2.6 volts.

12. A charge pump apparatus operable over a range of supply voltage, comprising:
a voltage input adapted to be coupled to a supply voltage source;
an oscillator configured to produce a clock signal;
a regulated charge pump and voltage booster circuit coupled to receive as an input the clock signal from the oscillator, the regulated charge pump and voltage booster circuit connected to the voltage input to receive a supply voltage therefrom, the regulated charge pump and voltage booster circuit configured to produce a clock output signal and an inverted clock output signal which are boosted in amplitude or not depending on a potential of the supply voltage; and
a plurality of charge pump stages connected to the voltage input to receive the supply voltage therefrom and connected to each other, each of the charge pump stages coupled to the regulated charge pump and voltage booster circuit to receive the clock output signal and the inverted clock output signal therefrom, the plurality of charge pump stages operative to produce a pumped voltage output.

13. The charge pump apparatus as in claim 12 wherein the clock signal produced by the oscillator switches between the supply voltage and ground.

14. The charge pump apparatus as in claim 12 wherein the clock output signal and the inverted clock output signal produced by the regulated charge pump and voltage booster circuit switch between the supply voltage and ground when not boosted in amplitude, but switch between a boosted voltage greater than the supply voltage and ground when boosted in amplitude.

15. The charge pump apparatus as in claim 14 wherein the boosted voltage of the clock output signal and the inverted clock signal is twice the supply voltage.

16. The charge pump apparatus as in claim 12 wherein the regulated charge pump and voltage booster circuit is configured to boost the amplitude whenever the supply voltage received from the voltage input is less than a threshold voltage level and to not boost the amplitude whenever the supply voltage is at least that of the threshold voltage level.

17. The charge pump apparatus as in claim 12 wherein the regulated charge pump and voltage booster circuit comprises:
- at least one driver circuit coupled to receive a clock signal and the power supply, the driver circuit including one or more charge storage devices, a plurality of switching devices responsive to the clock signal for selectively coupling the charge storage devices to the power supply, ground and a driver circuit clock output, and the driver circuit also including a voltage regulator coupled to the supply voltage and controlling action of said switching devices in accord with the relation between the supply voltage and a threshold voltage level such that:
- during a first clock phase of the clock signal, a first terminal of at least one of the charge storage devices is coupled to the supply voltage and a second terminal thereof is coupled to ground, such that the first terminal is charged to a supply voltage level, the clock output also coupled to ground, and during a second clock phase of the clock signal, the first terminal is coupled to the clock output and the second terminal is coupled to the supply voltage whenever the supply voltage is less than a threshold voltage level, such that the first terminal coupled to the clock output is charged further to greater than the supply voltage, and the second terminal is coupled to ground whenever the supply voltage is at least that of the threshold voltage level, such that the first terminal coupled to the clock output is at the supply voltage.

18. A method of operating a charge pump apparatus, comprising:
- coupling an oscillator stage of the charge pump apparatus to a clock input of a voltage booster, the voltage booster also having a voltage input coupled to a supply voltage, one or more charge storage devices and a plurality of switching devices, and a clock output;
- during a first clock phase of the clock signal, configurally arranging the switching devices to couple the clock output to ground and to couple a first terminal of at least one of the one or more charge storage devices to the voltage input such that the first terminal is charged to the supply voltage;
- during a second clock phase of the clock signal and if the supply voltage is at least that of a threshold voltage level, configurally arranging the switching devices to couple a second terminal of the at least one of the charge storage devices to ground and to couple the first terminal of the at least one of the charge storage devices to the clock output such that the clock output is charged to the level of the supply voltage; and
- during the second clock phase of the clock signal and if the supply voltage is less than the threshold voltage level, configurally arranging the switching devices to couple the second terminal of the at least one of the charge storage devices to the voltage input to charge said second terminal to the supply voltage, and to couple the first terminal of the at least one of the charge storage devices to the clock output such that the clock output is boosted to a level greater than the supply voltage, whereby the clock output supplies a clock signal corresponding to that received on the clock input but which is boosted in voltage amplitude or not depending upon the level of the supply voltage in relation to the threshold voltage level.

19. The method of claim 18, further comprising coupling the clock output to stages of a charge pump for the supply voltage.

20. The method of claim 18 wherein the threshold voltage is about 2.6 volts.

21. The method of claim 18 wherein the boosted voltage of the clock output is twice the supply voltage.

22. The method of claim 18 wherein configurally arranging the switching devices is controlled by a voltage regulator coupled to the supply voltage.

* * * * *